United States Patent
Tanaka

(10) Patent No.: US 7,736,268 B2
(45) Date of Patent: Jun. 15, 2010

(54) DEVICE FOR CONTROLLING AN INTERNAL COMBUSTION ENGINE

(75) Inventor: Hiroshi Tanaka, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 288 days.

(21) Appl. No.: 11/794,108

(22) PCT Filed: Apr. 11, 2006

(86) PCT No.: PCT/JP2006/008008
§ 371 (c)(1),
(2), (4) Date: Jun. 25, 2007

(87) PCT Pub. No.: WO2006/115091
PCT Pub. Date: Nov. 2, 2006

(65) Prior Publication Data
US 2008/0207395 A1    Aug. 28, 2008

(30) Foreign Application Priority Data
Apr. 22, 2005    (JP)    ............... 2005-124782

(51) Int. Cl.
*F16H 61/16*    (2006.01)
(52) U.S. Cl. .................. 477/125; 477/33
(58) Field of Classification Search ............. 477/32, 477/33, 115, 120, 121, 125; 701/102, 103, 701/109, 50, 55; 60/600, 611
See application file for complete search history.

(56) References Cited

U.S. PATENT DOCUMENTS

| | | | | | |
|---|---|---|---|---|---|
| 5,109,826 | A | * | 5/1992 | Kato | 123/564 |
| 5,133,228 | A | * | 7/1992 | Takata et al. | 477/33 |
| 5,245,541 | A | * | 9/1993 | Tomomatsu et al. | 701/56 |
| 5,245,893 | A | | 9/1993 | Koenig et al. | |
| 5,249,484 | A | * | 10/1993 | Matsuoka et al. | 477/121 |
| 5,778,329 | A | * | 7/1998 | Officer et al. | 701/55 |
| 6,290,627 | B1 | | 9/2001 | Kusafuka et al. | |
| 6,817,965 | B2 | * | 11/2004 | Tabata | 477/33 |
| 2003/0060328 | A1 | | 3/2003 | Beaty | |
| 2003/0216847 | A1 | * | 11/2003 | Bellinger | 701/51 |

FOREIGN PATENT DOCUMENTS

| | | |
|---|---|---|
| DE | 1 96 22 233 | 1/1997 |
| EP | 1 158 217 | 11/2001 |
| JP | 2-197431 | 8/1990 |
| JP | 6-249012 | 9/1994 |
| JP | 7-156691 | 6/1995 |
| JP | 2000-52817 | 2/2000 |
| JP | 2003-166638 | 6/2003 |

* cited by examiner

*Primary Examiner*—Roger L Pang
*Assistant Examiner*—Justin Holmes
(74) *Attorney, Agent, or Firm*—Oblon, Spivak, McClelland, Maier & Neustadt, L.L.P.

(57) ABSTRACT

In a device for controlling an internal combustion engine, with a turbo-charger, which carries out a lean combustion of a desired lean air-fuel ratio, an up-shifting of an automatic transmission is prohibited when an opening degree of the throttle valve is equal to or larger than a predetermined opening degree and a boost pressure of said turbo-charger is equal to or lower than a predetermined pressure.

20 Claims, 3 Drawing Sheets

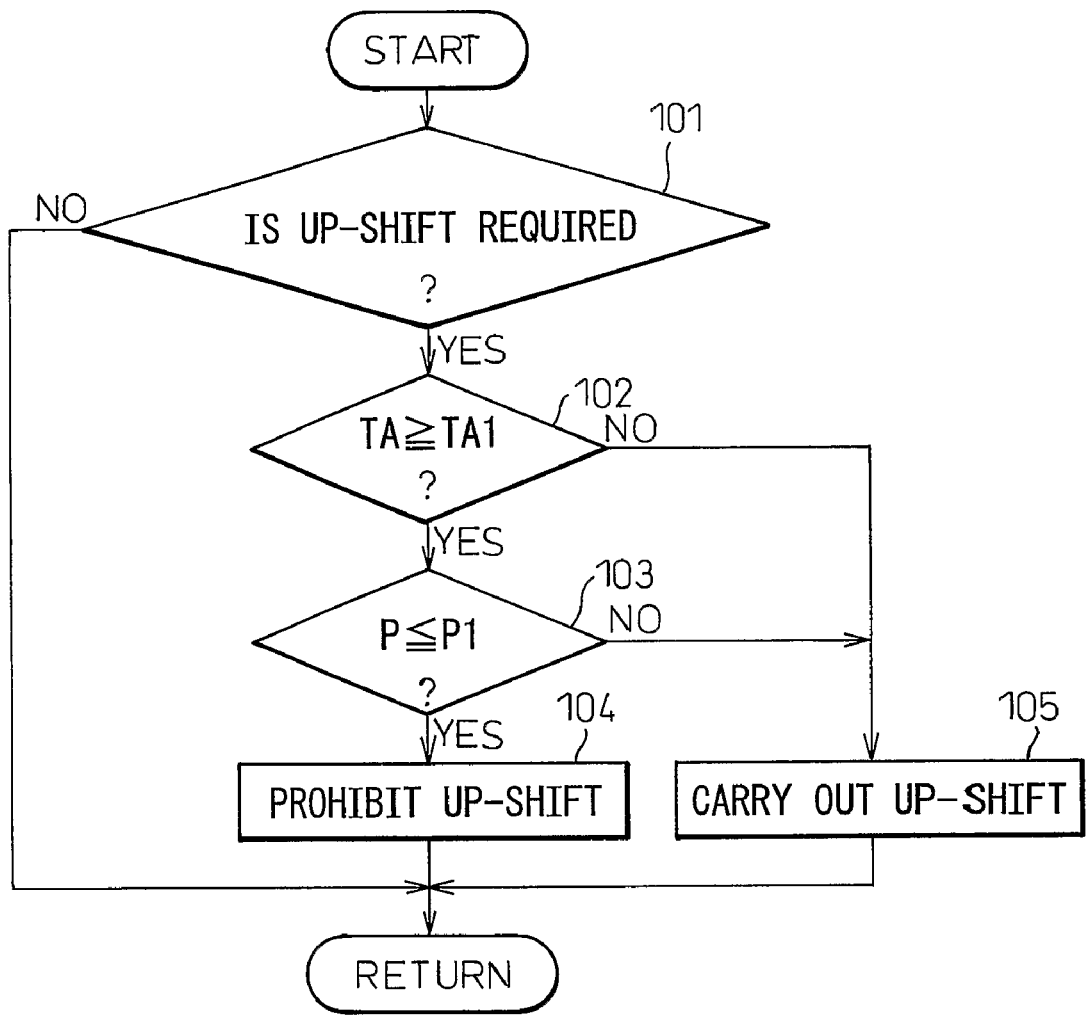

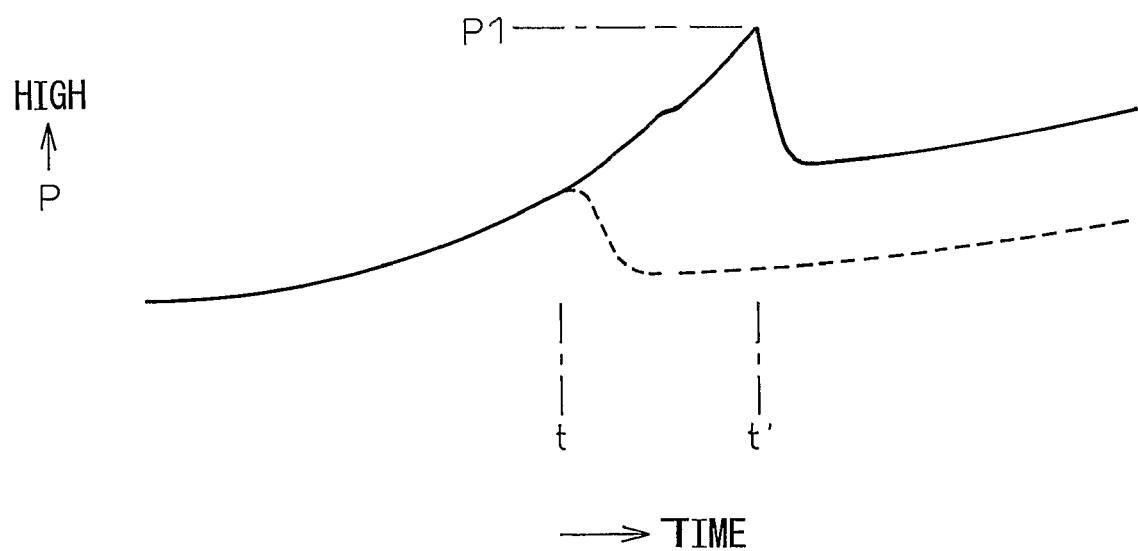

DEVICE FOR CONTROLLING AN INTERNAL COMBUSTION ENGINE

TECHNICAL FIELD

The present invention relates to a device for controlling an internal combustion engine.

BACKGROUND ART

An internal combustion engine which can change over from a lean air-fuel ratio combustion to a normal stoichiometric air-fuel ratio combustion is known. When an automatic transmission is combined with such an internal combustion engine, the automatic transmission is down-shifted by a normal shift control as soon as acceleration is required in the lean air-fuel ratio combustion region in which an extra driving force is small, and thus driveability deteriorates. To solve this problem, it is proposed that the down-shifting control of the automatic transmission in the lean air-fuel ratio combustion is prohibited for a predetermined period. (Refer to Japanese Unexamined Patent Publication Nos. 6-249012, 2000-52817 and 2-197431.)

DISCLOSURE OF THE INVENTION

By the way, it has been proposed that an air-fuel ratio of the lean combustion is set to a desired lean air-fuel ratio in which $NO_x$ production can be reduced sufficiently. In an internal combustion engine that carries out the lean combustion at this desired lean air-fuel ratio, if a turbo-charger is provided, a large amount of intake air can be supplied into the cylinder by pressure-charging within a pressure-charge area in which an opening degree of the throttle valve is larger than a predetermined opening degree, and thus an engine operating area in which the lean combustion of the desired lean air-fuel ratio is carried out can be extended to the high engine load side.

However, in this case, when the automatic transmission is up-shifted under a relatively gentle acceleration within the pressure-charge area of the lean combustion region, the engine speed is lowered and thus the boost pressure cannot be made high to increase the amount of intake air. Therefore, an air-fuel ratio of the lean combustion after the up-shifting becomes richer than the desired lean air-fuel ratio and thus an amount of produced $NO_x$ can increase suddenly.

Therefore, an object of the present invention is to provide a device for controlling an internal combustion engine with a turbo-charger which carries out a lean combustion of a desired lean air-fuel ratio, which device can prevent a sudden increase of an amount of produced $NO_x$ without carrying out the lean combustion of the desired lean air-fuel ratio after the up-shifting of the automatic transmission within the pressure-charge area.

According to the present invention described in claim 1, there is provided a device for controlling an internal combustion engine, with a turbo-charger, which carries out a lean combustion at a desired lean air-fuel ratio, characterized in that an up-shifting of an automatic transmission is prohibited when an opening degree of the throttle valve is equal to or larger than a predetermined opening degree and a boost pressure of said turbo-charger is equal to or lower than a predetermined pressure.

When the opening degree of the throttle valve is equal to or larger than the predetermined degree but the boost pressure is equal to or lower than the predetermined pressure, the current turbine speed does not reach a turbine speed produced by the current gear ratio and the current opening degree of the throttle valve. At this time, if the up-shifting of the automatic transmission is carried out, the engine speed will be lowered and thus the turbine speed will not be increased. Therefore, according to the present invention, at this time, the up-shifting is prohibited. The up-shifting will be carried out after the turbine speed has increased and the boost pressure has become higher than the predetermined pressure. Accordingly, the lean combustion of the desired lean air-fuel ratio can be realized after the up-shifting and thus it can be prevented that the amount of produced $NO_x$ increases suddenly.

BRIEF DESCRIPTION OF THE DRAWINGS

FIG. 2 is a flow-chart for limiting an up-shifting in a first combustion; and

FIG. 3 is a time-chart showing a change of the boost pressure under an acceleration in a first combustion.

BEST MODE FOR CARRYING OUT THE INVENTION

Figure 1:
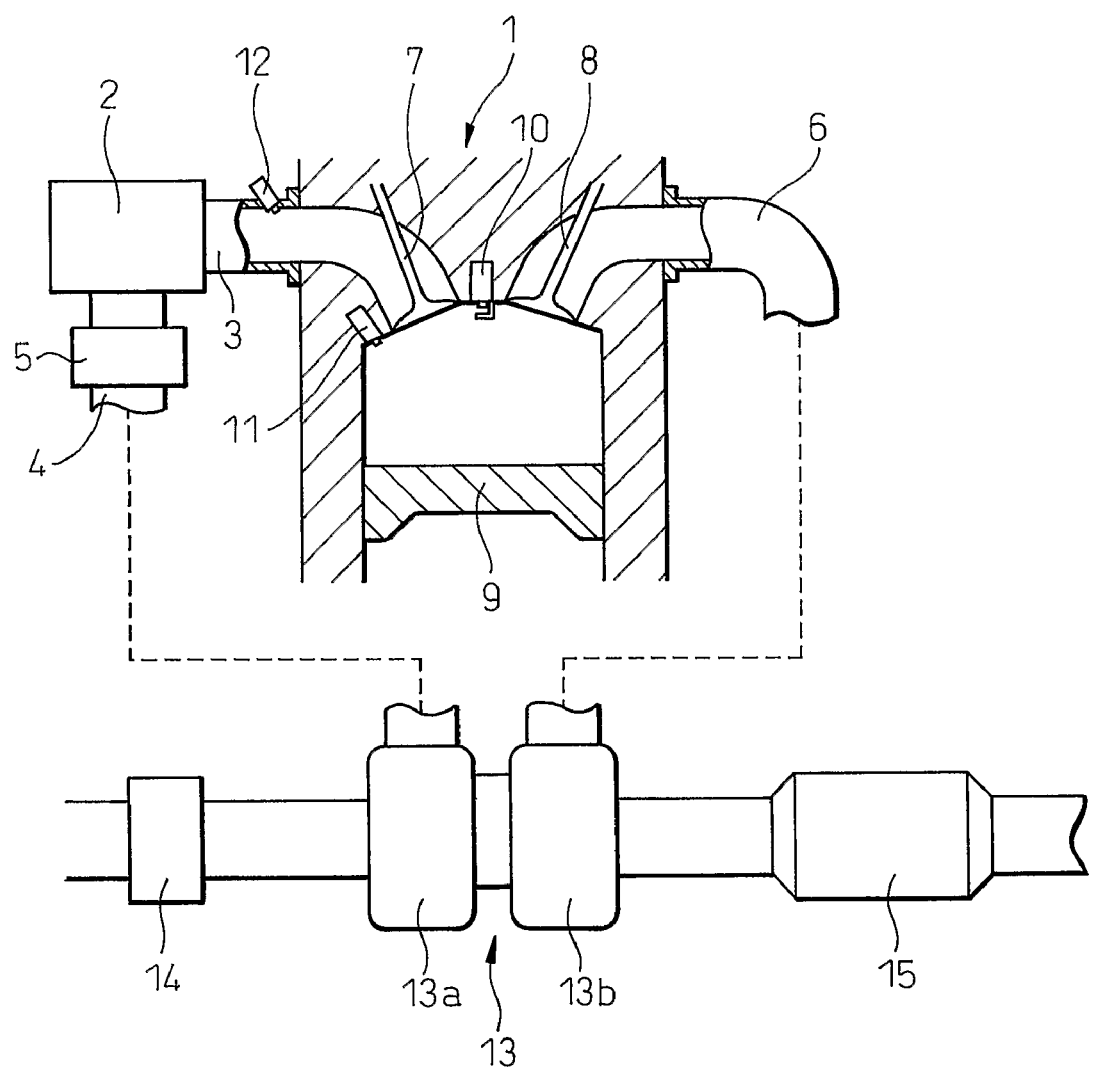
FIG. 1 is a schematic view showing an internal combustion engine controlled by a device according to the present invention.

FIG. 1 is a schematic view showing an internal combustion engine controlled by a device according to the present invention. In FIG. 1, reference numeral 1 is an engine body and 2 is a surge-tank that is common to all cylinders. Reference numeral 3 is an intake branch pipe communicating between the surge-tank 2 and each of the cylinders and 4 is an intake passage upstream of the surge-tank 2. In the intake passage 4, a throttle valve 5 is arranged immediately upstream of the surge-tank 2. Reference numeral 6 is an exhaust manifold communicated with each of the cylinders.

In the engine body 1, reference 7 is an intake valve, 8 is an exhaust valve, 9 is a piston, and 10 is an ignition plug. Reference numeral 11 is a first fuel injector that injects fuel directly into the cylinder. Reference numeral 12 is a second fuel injector that is arranged in each of the intake branch pipes 3.

In the intake passage 4, a compressor 13a of a turbo-charger 13 is arranged upstream of the throttle valve 5, and an air-flow meter 14 is arranged upstream of the compressor 13a. The intake passage 4 upstream of the air-flow meter 14 opens to the atmosphere via an air-cleaner (not shown). On the other hand, the exhaust-manifold 6 downstream of the exhaust gas merging portion thereof is connected to a turbine 13b of the turbo-charger 13 and the exhaust passage downstream of the turbine 13b communicates with a muffler (not shown) via a catalytic apparatus 15 for absorbing and reducing $NO_x$.

In the engine, the second fuel injector 12 injects fuel during an intake stroke (synchronous injection) or before an intake stroke (non-synchronous injection) and the first fuel injector 11 also injects fuel during the intake stroke, to carry out a uniform charge combustion with a uniform charge mixture formed in the cylinder. An air-fuel ratio of the uniform charge combustion is usually made leaner than the stoichiometric air-fuel ratio to reduce the fuel consumption. In such a lean combustion, a suitable desired lean air-fuel ratio (for example, 20) is selected such that a large amount of $NO_x$ is not produced. However, a certain amount of $NO_x$ is produced. Therefore, it is required that the catalytic apparatus 15 for absorbing and reducing $NO_x$ absorbs $NO_x$ to sufficiently decrease the amount of $NO_x$ emitted to the atmosphere.

The fuel injected from the second fuel injector 12 impinges the wall of the intake port between the intake branch pipe 3 and the intake valve 7 and thus is atomized. When the atomized fuel is supplied into the cylinder with the intake air, the fuel can be easily vaporized in the cylinder to advantageously form a good uniform charge mixture. On the other hand, there is fuel sticking on the wall of the intake port and thus it is difficult to accurately supply a desired amount of fuel into the cylinder. Against this, the fuel injected from the first fuel injector 11 must be atomized and vaporized in the cylinder and, thus, if a large amount of fuel is injected by the first fuel injector, it is difficult to vaporize all the fuel before an ignition timing. However, a desired amount of fuel can be accurately supplied into the cylinder.

Therefore, in a low engine load operating condition, and the like, in which a required amount of fuel is small and it is desired that the required amount of fuel is surely supplied into the cylinder, it is preferable that mainly the first fuel injector 11 injects fuel. On the other hand, in a middle engine load operating condition in which a required amount of fuel is relative large and an amount of unburned fuel in the exhaust gas can become large, it is preferable that mainly the second fuel injector 12 injects fuel.

In a high engine load operating condition in which the engine load is higher than in the middle engine load operating condition, the lean combustion cannot produce enough engine output and thus a uniform charge combustion of the stoichiometric air-fuel ratio (or an air-fuel ratio which is richer than the stoichiometric air-fuel ratio) is carried out. To purify the exhaust gas of the uniform charge combustion at the stoichiometric air-fuel ratio, a three way catalytic apparatus may be arranged in the exhaust system. The combustion of the lean air-fuel ratio is referred to as a first combustion, and the combustion of the stoichiometric air-fuel ratio is referred to as a second combustion. In the second combustion, if a rate of an amount of fuel injected by the first fuel injector 11 increases, the temperature within the cylinder decreases with the vaporization of the fuel within the cylinder and thus the intake charging efficiency can be increased.

The engine 1 has the turbo-charger 13 and thus a relatively large amount of intake air can be supplied into the cylinder by the pressure-charging thereof. Accordingly, even if a relatively large amount of fuel is supplied into the cylinder, the first combustion of the desired lean air-fuel ratio can be carried out and thus the engine operating area of the first combustion can be extended to the high engine load side. However, even if the pressure-charging is carried out by the turbo-charger 13, an amount of intake air that realizes the desired lean air-fuel ratio with the amount of fuel required in the high engine load operating condition cannot be supplied into the cylinder. Therefore, in the high engine load operating condition, the second combustion is carried out.

Thus, the first combustion is changed over to the second combustion at a change over engine load on the relatively high engine load side. At this time, an amount of required intake air decreases. Therefore, although an amount of depression of the accelerator pedal is relatively large, the opening degree of the throttle valve 5 must be reduced. Accordingly, the throttle valve 5 is not connected to the accelerator pedal mechanically and is allowed to be freely opened by an actuator.

An automatic transmission is combined with the engine 1. A gear ratio map of the automatic transmission is, for example, one to decide the gear ratio on the basis of the combination of an amount of depression of the accelerator pedal and the engine speed. A gear ratio map suitable for the second combustion by which the high engine output can be obtained and another gear ratio map suitable for the first combustion by which the very high engine output cannot be obtained are set. These gear ratio maps are different from each other.

By the way, as mentioned above, the turbo-charger 13 is attached to the engine 1 and pressure-charging is carried out. Accordingly, in each of the gear ratio maps for the first and second combustions, each gear ratio is set on the basis of an engine outputs when a boost pressure on the basis of a combination of an amount of depression of the accelerator pedal and an engine speed, namely, a steady boost pressure of this combination is realized.

Comparing the first combustion and the second combustion, when similar amounts of fuel are added in the first and second combustions, a required amount of intake air added in the first combustion is larger than that in the second combustion because the air-fuel ratio of the first combustion is larger than that of the second combustion. Therefore, the opening degree of the throttle valve in an acceleration of the first combustion is controlled to increase more rapidly than that in an acceleration of the second combustion. Accordingly, a response delay of the turbo-charger in the first combustion is very much larger than that in the second combustion.

Of course, in the second combustion, there is a small response delay of the turbo-charger and therefore, strictly speaking, the engine output corresponding to an amount of depression of the accelerator pedal in each instant during an acceleration in the second combustion cannot be obtained. However, even if the up-shifting of the automatic transmission is carried out simultaneously with the up-shift timing in the gear ratio map of the second combustion, a driver feels only a small lack of the driving force after the up-shifting and a large problem does not occur.

Against this, the response delay of the turbo-charger in an acceleration of the first combustion is very large. Accordingly, if the up-shifting of the automatic transmission is carried out simultaneously with the up-shift timing in the gear ratio map of the first combustion, the opening degree of the throttle valve will be increased after the up-shifting but the air-fuel ratio becomes richer than the desired lean air-fuel ratio because of a lack of the intake air with the insufficient boost pressure. Therefore, a problem in which an amount produced $NO_x$ increases suddenly occurs.

To solve this problem, the device of the present invention restricts the up-shifting of the automatic transmission in the first combustion according to a flow-chart shown in FIG. 2. The flow-chart is repeated each time a predetermined time has elapsed or at a predetermined crank angle. First, at step 101, it is determined if the up-shifting is required on the basis of the combination of a current amount of depression of the accelerator pedal and a current engine speed. When the result is negative, the routine is finished. On the other hand, when the result is positive, it is determined if a current opening degree (TA) of the throttle valve is equal to or larger than a predetermined opening degree (TA1) at step 102. When the result is negative, the up-shifting is carried out at step 105.

On the other hand, when the current opening degree (TA) of the throttle valve is equal to or larger than the predetermined opening degree (TA1), the current engine operating condition is within the pressure-charge area in which the pressure-charging is carried out by the turbo-charger 13. At this time, it is determined if a current boost pressure (P) is equal to or lower than a predetermined boost pressure (P1) at step 103. FIG. 3 is a time-chart showing a change of the boost pressure (P) during an acceleration in the first combustion. As mentioned above, in an acceleration of the first combustion, a large response delay in the turbo-charger is produced and thus a time (t) on the basis of the actual amount of depression of the accelerator pedal and the actual engine speed becomes the up-shift timing but the actual boost pressure at the time (t) does not become sufficiently high.

If the up-shifting is carried out at the time (t), the engine speed will be lowered and, therefore, the turbine speed will be lowered. Accordingly, as shown by a dotted line, the boost pressure (P) is lowered. With this, a sufficient amount of intake air cannot be supplied into the cylinder by the pressure-charging and thus the desired lean air-fuel ratio cannot be realized in the first combustion after the up-shifting. Therefore, the engine output does not drop and an amount of produced $NO_x$ also increases suddenly with the air-fuel ratio richer than the desired lean air-fuel ratio.

Accordingly, in the flow-chart, when the current opening degree (TA) of the throttle valve is equal to or larger than the predetermined opening degree (TA1) and the current boost pressure (P) is equal to or lower than the predetermined boost pressure (P1), the result at step 103 is positive and the up-shifting is prohibited at step 104 because a boost pressure almost corresponding to the combination of the amount of depression of the accelerator pedal and the engine speed at the up-shift timing on the map is not realized by the response delay of the turbo-charger.

On the other hand, when the current opening degree (TA) of the throttle valve is equal to or larger than the predetermined opening degree (TA1) and the current boost pressure (P) is higher than the predetermined boost pressure (P1), the result at step 103 is negative and the up-shifting is carried out at step 105 because a boost pressure almost corresponding to the combination of the amount of depression of the accelerator pedal and the engine speed at the up-shift timing is realized.

Thus, after the time (t), that is, the up-shift timing on the basis of the combination of the amount of depression of the accelerator pedal and the engine speed, the up-shift is carried out at the time (t') when the boost pressure (P) reaches the predetermined pressure (P1). Immediately after the up-shifting, the boost pressure (P) is lowered with the decrease of the engine speed, but a sufficient amount of intake air can be supplied into the cylinder with the increase of the opening degree of the throttle valve. Therefore, the first combustion of the desired lean air-fuel ratio can be realized and thus problems in which the engine output is lowered and the amount of produced $NO_x$ increases suddenly do not occur.

Thus, according to the present embodiment, at the up-shift timing in the pressure-charge area within the engine operating area of the first combustion, the up-shifting is prohibited until the boost pressure increases sufficiently to the predetermined pressure. Of course, when a plurality of up-shift timings is set within this pressure-charge area, each up-shifting is preferably prohibited until a boost pressure almost corresponding to each of the up-shift timings is realized. Moreover, there is the small response delay of the turbo charger in the second combustion and therefore the up-shift may be prohibited until a boost pressure almost corresponding to the up-shift timing in the pressure-charge area within the engine operating area of the second combustion is realized. In this case, the response delay of the turbo-charger in the second combustion is shorter than that in the first combustion and thus the period in which the up-shift is prohibited in the first combustion is longer than that in the second combustion.

LIST OF REFERENCE NUMERALS

1: engine body
13: turbo-charger

The invention claimed is:

1. A device for controlling an internal combustion engine, with a turbo-charger comprising:
    a first control which controls shifting of an automatic transmission, wherein said first control provides a decision to up-shift the automatic transmission:
    a second control which overrides said first control such that an up-shifting of an automatic transmission is prohibited, despite said decision by said first control to up-shift, when an opening degree of a throttle valve is equal to or larger than a predetermined opening degree and a boost pressure of said turbo-charger is equal to or lower than a predetermined pressure; and
    wherein the up-shifting proceeds when the decision to up-shift is made by the first control and either: (a) the degree of opening of the throttle valve is not eQual to or larger than the predetermined opening degree, or (b) the boost pressure of said turbo-charger is not equal to or lower than the predetermined pressure.

2. A device according to claim 1, wherein the first control makes the decision to up-shift based on accelerator position and engine speed.

3. A device according to claim 1, wherein the first control makes the decision to up-shift based on a gear ratio map which indicates that an up-shift is needed.

4. A device according to claim 3, wherein said gear ratio map indicates a gear ratio based on accelerator pedal position and engine speed.

5. A device according to claim 4, in combination with an internal combustion engine, wherein the internal combustion engine carries out a lean combustion in which the air to fuel ratio is leaner than a stoichiometric air to fuel ratio.

6. A device according to claim 4, wherein the device controls the engine according to at least a first combustion air-fuel ratio and a second combustion air-fuel ratio, and wherein the first combustion air-fuel ratio is leaner than said second combustion air-fuel ration.

7. A device according to claim 5, wherein said second control overrides the decision of the first control to up-shift at least when the engine is controlled to operate according to the first combustion air-fuel ratio.

8. A device according to claim 7, wherein the second control causes a first delay period during which an up-shift is prohibited when the engine is operating according to the first combustion air-fuel ratio, and further wherein the second control causes a second delay period during which an up-shift is prohibited when the engine is operating according to the second combustion air-fuel ratio, and wherein the first delay period is longer than the second delay period.

9. A device according to claim 8, wherein the second combustion air-fuel ratio is a stoichiometric air-fuel ratio.

10. A device according to claim 1, wherein the device controls the engine according to at least a first combustion air-fuel ratio and a second combustion air-fuel ratio, and wherein the first combustion air-fuel ratio is leaner than said second combustion air-fuel ration.

11. A device according to claim 10, wherein the second control causes a first delay period during which an up-shift is prohibited when the engine is operating according to the first combustion air-fuel ratio, and further wherein the second control causes a second delay period during which an up-shift is prohibited when the engine is operating according to the second combustion air-fuel ratio, and wherein the first delay period is longer than the second delay period.

12. A device according to claim 11, wherein after the second control overrides the first control to prohibit the up-shifting, the opening degree of the throttle valve and the boost pressure of the turbo-charger are repeatedly checked and the up-shifting is allowed to proceed when at least one of: (a) the degree of opening of the throttle valve is not equal to or larger than the predetermined opening degree, or (b) the boost pressure of said turbo-charger is not equal to or lower than the predetermined pressure.

13. A device according to claim 1, wherein after the second control overrides the first control to prohibit the up-shifting, the opening degree of the throttle valve and the boost pressure of the turbo-charger are repeatedly checked and the up-shifting is allowed to proceed when at least one of: (a) the degree of opening of the throttle valve is not equal to or larger than the predetermined opening degree, or (b) the boost pressure of said turbo-charger is not equal to or lower than the predetermined pressure.

14. A control system for controlling an internal combustion engine with a turbo-charger, wherein the control system controls the engine according to at least a first combustion air-fuel ratio and a second combustion air-fuel ratio, and wherein the first air-fuel ratio is leaner than the second combustion air-fuel ratio, the control system comprising:
   a first control which controls shifting of an automatic transmission, wherein said first control provides a decision to up-shift the automatic transmission based on accelerator position and engine speed;
   a second control which overrides said first control at least when the engine is operating according to the first combustion air-fuel ratio and wherein said second control overrides the first control to prohibit an up-shifting of the automatic transmission when both: (a) an opening degree of a throttle is equal to or larger than a predetermined opening degree, and (b) a boost pressure of said turbo-charger is equal to or lower than a predetermined pressure.

15. A device according to claim 14, wherein after the second control overrides the first control to prohibit the up-shifting, the opening degree of the throttle valve and the boost pressure of the turbo-charger are repeatedly checked and up-shifting is allowed to proceed when at least one of: (a) the degree of opening of the throttle valve is not equal to or larger than the predetermined opening degree, or (b) the boost pressure of said turbo-charger is not equal to or lower than the predetermined pressure.

16. A device according to claim 15, wherein the second combustion air-fuel ratio is a stoichiometric air-fuel ratio.

17. A device according to claim 14, wherein the second control causes a first delay period during which an up-shift is prohibited when the engine is operating according to the first combustion air-fuel ratio, and further wherein the second control causes a second delay period during which an up-shift is prohibited when the engine is operating according to the second combustion air-fuel ratio, and wherein the first delay period is longer than the second delay period.

18. A control system according to claim 14, wherein the first control makes a decision to up-shift based on a gear ratio map, and wherein the second control overrides the decision based on the gear ratio map.

19. A control system according to claim 14, wherein the first control makes a decision to up-shift based on a first gear ratio map when operating according to the first combustion air-fuel ratio and based on a second gear ratio map when operating according to the second air-fuel ratio, and wherein the second control causes a first delay period during which an up-shift is prohibited when the engine is operating according to the first combustion air-fuel ratio, and further wherein the second control causes a second delay period during which an up-shift is prohibited when the engine is operating according to the second combustion air-fuel ratio, and wherein the first delay period is longer than the second delay period.

20. A device according to claim 19, wherein the second combustion air-fuel ratio is a stoichiometric air-fuel ratio.

* * * * *

UNITED STATES PATENT AND TRADEMARK OFFICE
CERTIFICATE OF CORRECTION

| | | |
|---|---|---|
| PATENT NO. | : 7,736,268 B2 | Page 1 of 1 |
| APPLICATION NO. | : 11/794108 | |
| DATED | : June 15, 2010 | |
| INVENTOR(S) | : Hiroshi Tanaka | |

It is certified that error appears in the above-identified patent and that said Letters Patent is hereby corrected as shown below:

Title page, item [87], delete "PCT/JP06/08008" to --PCT/JP06/308008--;

In Claim 6, last line, change "ration" to --ratio--; and

In Claim 10, last line change "ration" to --ratio--.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,736,268 B2 Page 1 of 1
APPLICATION NO. : 11/794108
DATED : June 15, 2010
INVENTOR(S) : Hiroshi Tanaka It is certified that error appears in the above-identified patent and that said Letters Patent is hereby corrected as shown below:

Title page, item [87], change "PCT/JP06/08008" to --PCT/JP06/308008--;

Column 6, line 37 (Claim 6, last line), change "ration" to --ratio--; and

Column 6, line 56 (Claim 10, last line), change "ration" to --ratio--.

This certificate supersedes the Certificate of Correction issued August 3, 2010.

Signed and Sealed this

Twenty-fourth Day of August, 2010

David J. Kappos
*Director of the United States Patent and Trademark Office*